P. J. WILCH.
FEEDER.
APPLICATION FILED JAN. 12, 1920.
1,357,755.
Patented Nov. 2, 1920.
2 SHEETS—SHEET 2.
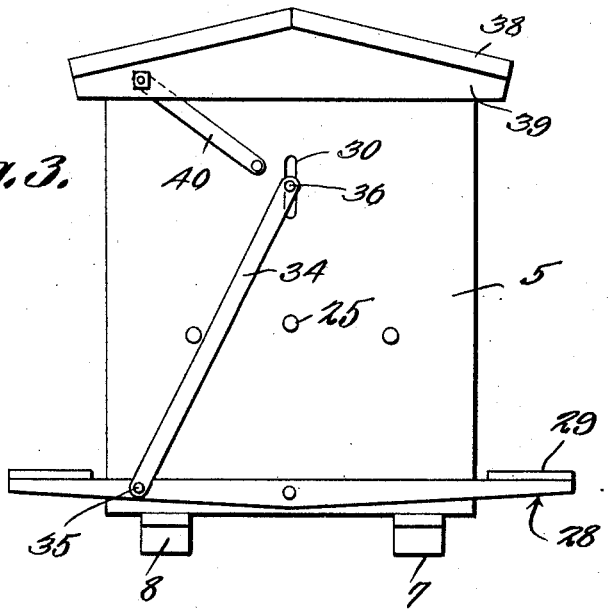
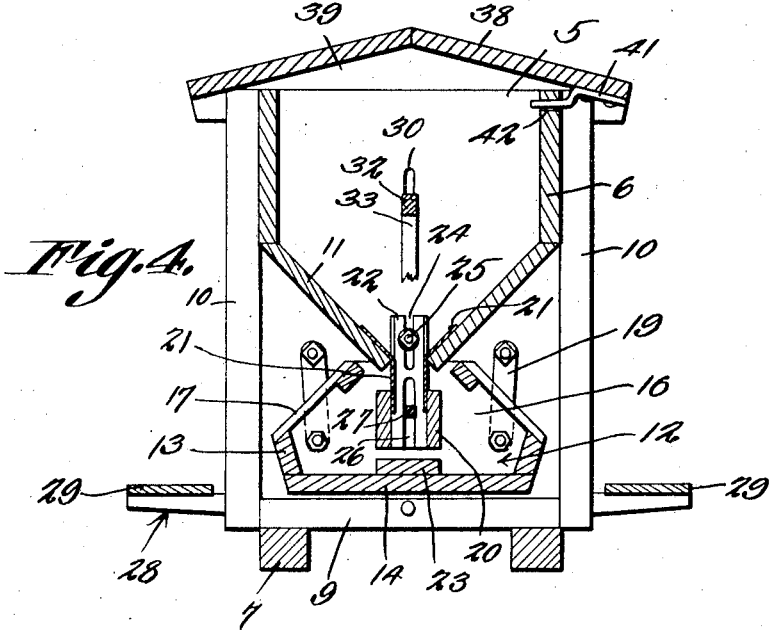
Inventor
P. J. Wilch
By C. A. Snow & Co.
Attorneys
Witness

UNITED STATES PATENT OFFICE.

PETER J. WILCH, OF JENERA, OHIO.

FEEDER.

1,357,755.  Specification of Letters Patent.  Patented Nov. 2, 1920.

Application filed January 12, 1920. Serial No. 350,765.

*To all whom it may concern:*

Be it known that I, PETER J. WILCH, a citizen of the United States, residing at Jenera, in the county of Hancock and State of Ohio, have invented a new and useful Feeder, of which the following is a specification.

This invention relates to improved feeding troughs, and it is the primary object of the invention to provide a feeder having automatic means for agitating the material being fed for causing the same to properly feed to the feed compartments thereof.

A further object of the invention is to provide a feeder to be operated by the movement of the swine being fed, thus eliminating the use of the usual mechanical means for causing the operation of the agitators.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Fig. 3 is an end elevational view; and

Fig. 4 is a sectional view taken on line 4—4 of Fig. 1.

Figure 1:
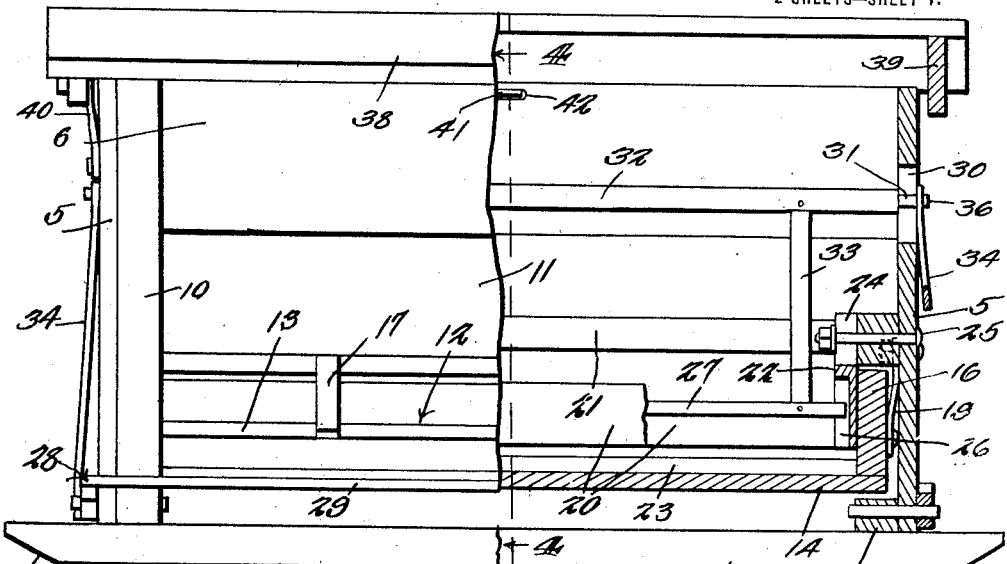
Figure 1 illustrates a front elevational view of a feeder, constructed in accordance with the present invention, the same being shown as partly broken away.
Figure 2:
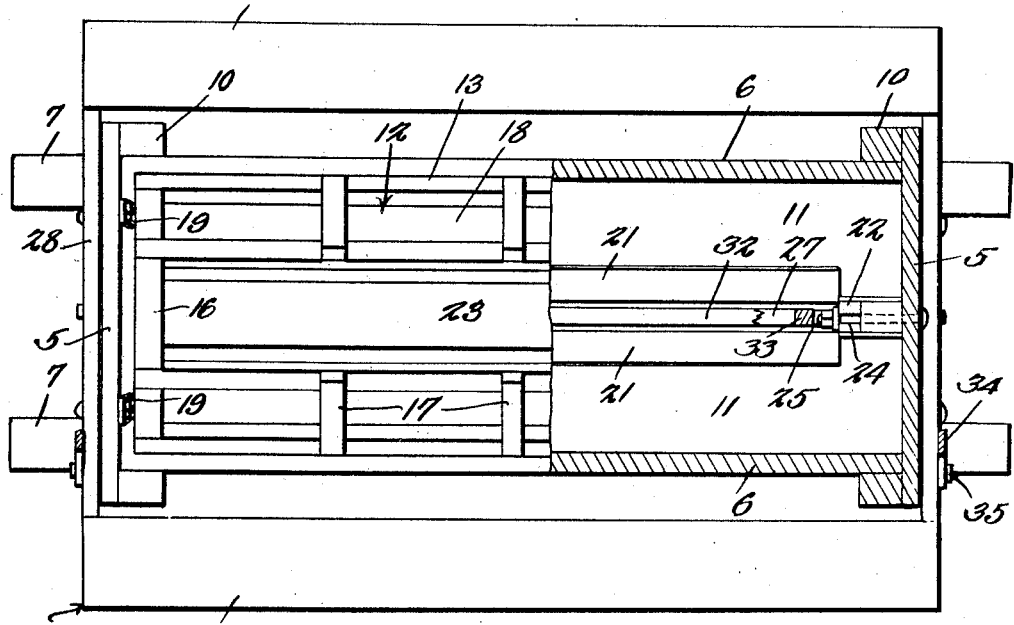
Fig. 2 illustrates a plan view partly broken away.

Referring to the drawings in detail, the feeder includes the end walls 5 and side walls 6, which extend downwardly from a point adjacent the upper edges of the end walls 5, terminating at a point substantially intermediate the lengths of the end walls 5, to provide a clearance between the lower edges of the side walls 6 and the lower portion of the feeder.

Skids 7 are arranged under the end walls 5 of the feeder for supporting the feeder proper, and as shown, the skids are disposed in spaced parallel relation with each other, the ends thereof extending beyond the vertical plane of the end walls 5 of the feeder, the lower portions of each of the skids being inclined or beveled as at 8 to permit the skids to readily move over the ground surface on which the device is supported to enable the feeder to be moved to various locations, at the will of the operator.

End braces 9 also form a part of the feeder, and as shown, by Fig. 4 of the drawings, the end braces 9 rest on the skids 7, and brace the ends of the feeder by their connections with the brace bars 10 which extend from points adjacent the upper edges of the skids 7, and terminate at points adjacent the upper ends of the end walls 5.

Secured to these end walls 5, and forming continuations of the side walls 6, are the inclined boards 11, which as shown are inclined toward the center of the feeder, the adjacent edges thereof lying in spaced relation with each other, to provide a clearance for allowing food or material contained in the feeder to pass from the upper portion of the feeder or hopper, formed by the side walls 6 and inclined boards 11.

Pivotally supported between the end walls 5, and in a position directly under the inclined boards 11, is a feed trough 12 which includes side walls 13 and a bottom member 14, the walls 13 providing means for connecting the end walls 16 of the trough 12, and at the same time provide supports for the partitioning members 17 which partition the feed trough into a plurality of feeding compartments indicated by the reference character 18.

The links 19 have connection with the end walls 16 of the feed trough 12, at the lower ends thereof, the upper ends of the links 19 having pivotal connection with the end walls 5 of the feeder proper.

From the foregoing it is obvious that the trough 12 is free to move or rock within the feeder proper, to cause the material contained in the hopper to become loosened so that the same may readily pass into the feed trough 12.

Longitudinal movement of the feed trough 12 with relation to the feeding device proper, is prevented by means of the extensions 20, which are disposed between the end walls of the feed trough 12 to provide a delivery spout. This spout is associated with the metallic members 21, which have their upper edges secured to the inner side walls of the inclined boards 11, the lower edges thereof operating between the extensions 20, and due to the end bars 22, which are connected to the extensions 20, having adjustable connection with the end members 5 of the feeder proper, the extensions 20 may be adjusted with relation to the feed trough 12, and more particularly the scraping bar 23, which acts to move the material deposited by the spout to distribute the same evenly throughout the various feed compartments of the feed trough 12.

The end bars 22 of the extensions 20 are slotted as at 24, which slots accommodate the bolts 25 for permitting the adjustment as just described, the bolts acting as securing means for securing the extensions 20 in their positions of adjustment.

Disposed within these end bars 22 are the slots 26 which slots provide clearances for the agitating bar 27 extending longitudinally of the feed trough between the extensions 20, this bar being provided for agitating the material between the extensions 20, to prevent the material clogging at this point to render the feeder inoperative, in the event that wet feed is deposited within the feeder.

A rocking frame 28 surrounds the lower portion of the feeder proper, and is of a size to pivot with relation to the feeder proper, and as shown this frame 28 includes the platforms or treadles 29 disposed in such relation with the feed trough that the swine being fed must rest their fore feet on the platforms with the result that movement of the bodies of the swine will cause a relative movement of the agitating arms, to be hereinafter more fully described, to indirectly cause the operation of the agitating bar 27.

Slots 30, are formed in the end walls 5 of the feeder proper, and accommodate the reduced portions 31 of the agitating bar 32, extending the entire distance between the end walls 5, the bars 33 which have connection with the agitating bar 32 extend downwardly to connect the agitating bar 32 to the agitating bar 27, so that movement of the agitating bar 32 causes a relative movement of the agitating bar 27 to cause the feeding of material through the hopper.

The agitator arms 34 connect the rocking frame 28 and agitating bar 32 by means of the pivot pins 35 and 36, the pivot pins being provided adjacent the ends of the agitator arms 34, and since these arms 34 are disposed at angles it is obvious that movement of the rocking frame 28 will cause a relative vertical movement of the agitating bars 32 and 27.

A cover 38 forms a part of the feeder and includes depending end sections 39 adapted to embrace the end and side walls of the feeder proper adjacent the upper edges thereof, in a manner to insure the cover 38 being held in proper relation to prevent moisture from entering the hopper to spoil the feed within the same, in the event that the hopper is employed in an open field.

Connecting links 40 provide means for securing the cover 38 to the feeder proper to permit the cover to be moved a predetermined distance laterally of the feeder proper, uncovering the upper portion of the feeder to permit the hopper to be filled. A right angled bracket 41 is secured to the underside of the cover, and is disposed in such relation with the slot 42 formed in one of the side walls 6 of the feeder proper that the same will enter the slot when the cover has been moved to a predetermined position, thus locking the cover against displacement by ordinary means.

From the foregoing it is evident that material which is deposited in the hopper of the feeder will be agitated by the agitating bar 32 to loosen the same and cause the discharge of the material to the feed trough 12, the action of the pivoted frame 28 causing the operation of the agitating bars.

It is believed that in view of the foregoing description a detailed description of the operation of the device, step by step, is unnecessary.

Having thus described the invention, what is claimed is:—

In a feeding device, a hopper, a lower feed trough pivotally supported under the hopper, a spout providing communication between the trough and hopper, said spout including end bars having slots, an agitating member disposed in the hopper, said agitating member including a lower agitating bar having its ends disposed within the slots, and means for automatically operating the agitating member to cause material to be fed to the trough.

In testimony that I claim the foregoing as my own, I have hereto affixed my signature in the presence of two witnesses.

PETER J. WILCH.

Witnesses:
 NORA GOSSMAN,
 GEO. GOSSMAN.